United States Patent
Pavone et al.

(10) Patent No.: US 9,498,746 B2
(45) Date of Patent: Nov. 22, 2016

(54) METHOD AND INSTALLATION FOR SEPARATING ACID COMPONENTS, DUST AND TAR FROM HOT GASES OF GASIFICATION INSTALLATIONS

(75) Inventors: Domenico Pavone, Bochum (DE); Ralf Abraham, Bergkamen (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 1030 days.

(21) Appl. No.: 13/516,346

(22) PCT Filed: Nov. 13, 2010

(86) PCT No.: PCT/EP2010/006922
§ 371 (c)(1),
(2), (4) Date: Jul. 6, 2012

(87) PCT Pub. No.: WO2011/082729
PCT Pub. Date: Jul. 14, 2011

(65) Prior Publication Data
US 2012/0269708 A1    Oct. 25, 2012

(30) Foreign Application Priority Data
Dec. 16, 2009    (DE) .......... 10 2009 058 656

(51) Int. Cl.
*B01D 53/48* (2006.01)
*B01D 53/50* (2006.01)
(Continued)

(52) U.S. Cl.
CPC ............. *B01D 50/002* (2013.01); *B01D 53/52* (2013.01); *B01D 53/83* (2013.01); *C10J 3/84* (2013.01); *C10K 1/024* (2013.01); *C10K 1/026* (2013.01); *C10K 1/30* (2013.01); *B01D 53/685* (2013.01); *B01D 2257/2045* (2013.01); *B01D 2257/2047* (2013.01); *B01D 2257/304* (2013.01); *C10J 2300/0959* (2013.01); *C10J 2300/0983* (2013.01)

(58) Field of Classification Search
None
See application file for complete search history.

(56) References Cited

U.S. PATENT DOCUMENTS

| 2,941,621 A | 6/1960 | Dygert et al. |
| 4,680,038 A | 7/1987 | Titus |

(Continued)

FOREIGN PATENT DOCUMENTS

| DE | 1 879 283 | 9/1963 |
| DE | 26 22 938 | 12/1976 |

(Continued)

OTHER PUBLICATIONS

International Search Report of PCT/EP2010/006922, May 24, 2011.
(Continued)

*Primary Examiner* — Stuart Hendrickson
*Assistant Examiner* — Daniel Berns
(74) *Attorney, Agent, or Firm* — Collard & Roe, P.C.

(57) ABSTRACT

Using a method and installation for separating acid components, dust and tar from hot gases of gasification installations, an economical method using a corresponding installation is to be created, which enables acid compounds HF, HCl, $H_2S$, dust and tar to be reliably separated in the highest possible temperature range. The aim is achieved in that the media flow leaving the gasification at above 700° C. is fed with additives to a desulfurization process and subsequently to a combined cyclone 9 having associated filter cartridges 17 in a common vessel 8, and the gas is withdrawn for further use downstream of the filter cartridges.

4 Claims, 3 Drawing Sheets

(51) Int. Cl.
*B01D 53/52* (2006.01)
*B01D 53/81* (2006.01)
*B01D 53/83* (2006.01)
*B01D 50/00* (2006.01)
*C10K 1/02* (2006.01)
*C10K 1/30* (2006.01)
*C10J 3/84* (2006.01)
*B01D 53/68* (2006.01)

(56) References Cited

U.S. PATENT DOCUMENTS

| | | | |
|---|---|---|---|
| 7,691,182 B1* | 4/2010 | Muradov et al. | 95/96 |
| 2006/0150510 A1* | 7/2006 | Hiltunen et al. | 48/210 |
| 2008/0060457 A1* | 3/2008 | Liu et al. | 73/863.31 |
| 2009/0056537 A1 | 3/2009 | Neumann | |
| 2009/0305093 A1 | 12/2009 | Biollaz et al. | |
| 2011/0062387 A1* | 3/2011 | Anfang et al. | 252/373 |
| 2011/0173886 A1 | 7/2011 | Abraham et al. | |

FOREIGN PATENT DOCUMENTS

| | | | |
|---|---|---|---|
| DE | 32 30 709 | 2/1984 | |
| DE | 34 22 592 | 4/1986 | |
| DE | 10 2006 017 353 | 10/2007 | |
| DE | 10 2008 049 579 | 4/2010 | |
| EP | 1 870 444 | 12/2007 | |
| GB | 1 537 863 | 5/1976 | |
| JP | 2000-303078 A | 10/2000 | |
| WO | WO 83/03556 | 10/1983 | |
| WO | WO 2008/055591 | 5/2008 | |
| WO | WO2009/132960 * | 11/2009 | B01J 23/63 |

OTHER PUBLICATIONS

English Translation of the Notification for the Opinion of Examination of Taiwanese Application No. 099140345, mailed Nov. 6, 2014.

Chilean Office Action dated Jun. 15, 2015 in CL 1592-12, with English translation of relevant part.

* cited by examiner

METHOD AND INSTALLATION FOR SEPARATING ACID COMPONENTS, DUST AND TAR FROM HOT GASES OF GASIFICATION INSTALLATIONS

CROSS REFERENCE TO RELATED APPLICATIONS

This application is the National Stage of PCT/EP2010/006922 filed on Nov. 13, 2010, which claims priority under 35 U.S.C. §119 of European Application No. 10 2009 058 656.3 filed on Dec. 16, 2009, the disclosure of which is incorporated by reference. The international application under PCT article 21(2) was not published in English.

In the gasification of fossil fuels, such as anthracite and bituminous coal, biomasses, refinery residues, for example, the chlorine or sulfur contained in them reacts to form acid gases, and this leads to erosive or corrosive problems in the downstream system components. In the gasification of biomasses, furthermore significant amounts of tars occur, which must be removed because the tar condensates can also lead to significant problems in downstream systems. A cleaning method for removing gases from a wood gasifier is known from EP 1 870 444 A2, which method uses filter cartridges and leaves the product gas more time for chemical reactions ahead of the filter cartridges. Cyclone separation is not provided there.

Possible separation of harmful acid gases can also result in that wet scrubbing methods are used, but this has the disadvantage that the gases have to be cooled greatly. Tar separation is carried out as what is called catalytic separation, in separate catalytic tar separators, whereby such an apparatus generally follows the $H_2S$ separation and the dust removal. If a corresponding catalyst precedes the filter, it is necessary for the synthesis gas to be heated back up to the operating temperature between 800° C. and 1000° C., because of the heat losses, and this leads to great losses in the degree of effectiveness and to correspondingly great technical effort.

It is the task of the invention to create an economical method with a corresponding system, which allows reliable separation of acid compounds HF, HCl, $H_2S$, dust, and tar, in the greatest possible temperature range.

With a method of the type indicated initially, this task is accomplished, according to the invention, in that the media stream that exits from gasification, at a temperature above 700° C., with additives, is passed to desulfurization and subsequently to a combined cyclone with assigned filter cartridges, in a common vessel, and that the gas is drawn off behind the filter cartridges, for further use.

With the invention, the result is achieved that because of the combined separation of the solids in a common apparatus, at a high temperature, lower heat losses can be achieved, whereby at the same time, the addition of additives can take place at different positions, depending on the method of procedure:

The addition of additives can either take place simultaneously with the fuel or in the gasifier region or with recirculated quenching gas, as is described, for example, in DE 10 2008 049 579 of the applicant, whereby fundamentally, the possibility also exists of bringing in the additives particularly before dust removal, depending on the method sequence.

In one embodiment, it is provided, according to the invention, that separation of acid gas components, for example $H_2S$ separation, is undertaken before dust removal, by means of an addition of additives.

Another embodiment of the invention consists in that tar separation is undertaken by means of the addition of additives before dust removal, or that residual tar separation is undertaken on and/or within the cartridge filters.

To accomplish the task indicated above, the invention also provides a system for separation of acid components, dust, and tar from hot waste gases of gasification systems, which system is characterized in that a cyclone separator and a cartridge filter are provided within a vessel, one above the other in the direction of gravity, whereby the central pipe of the cyclone separator is passed into the filter space equipped with the filter cartridges.

The assignment of the cyclone separator and of the cartridge filters within a device having the positioning according to the invention leads to low flow losses with simultaneous great efficiency.

At this point, it should be noted that in and of themselves, combination devices composed of filter(s) and cyclone are known, for example from the German utility model 1 879 283, whereby there, no consideration is given, in particular, to discharge of micro-dust. Filters having a corresponding construction and a small size are also shown by DE 26 22 938 B, DE 32 30 709 A, or DE 34 22 592 A, to mention only a few examples. Modified embodiments are shown by U.S. Pat. No. 2,941,621 or WO83/03556.

In one embodiment, the invention provides that the partition between cyclone separator and filter space is configured as a funnel-shaped bottom through which the central pipe of the cyclone separator passes, whereby a down-pipe for micro-dust, which is smaller in diameter, is positioned in the central pipe, with feed elements for the micro-dust from the funnel bottom into the down-pipe.

This special embodiment of a system according to the invention is additionally characterized in that the feed elements are configured as pipe sockets disposed in spoke form between the head region of the down-pipe and the central pipe, at the low point of the funnel bottom.

A somewhat modified embodiment of a corresponding system consists, according to the invention, in that a slanted bottom is provided in the filter space, at a distance from the central pipe, having a lateral vent for withdrawal of the micro-dust and an eccentric passage for the gas that flows through the central pipe.

The invention also provides, independent of the apparatus configuration, that the filter cartridges are provided with a catalytic coating and/or a catalytic filling.

BRIEF DESCRIPTION OF THE DRAWINGS

Further characteristics, details, and advantages of the invention are evident on the basis of the following description and using the drawing, which shows, in FIG. 1 a fundamental schematic of a system for implementation of the method according to the invention, FIG. 2 in a simplified sectional representation, an apparatus embodiment according to the invention, FIG. 3 a slightly enlarged partial top view of the central pipe according to Arrow III in FIG. 2, and in FIG. 4 in the representation of FIG. 2, a modified apparatus embodiment.

The system indicated in general with 1 in FIG. 1 is represented as a fundamental schematic there. In this connection, fuel (dotted arrow 3), oxygen (solid arrow 4), and, if applicable, additives (broken-line arrow 5) are passed to a gasifier 2. The slag removal vent is indicated with 6. The gasifier 2 is followed by a desulfurization 7 and subsequently by the apparatus 8, in which a cyclone 9 and a cartridge filter region 10 are combined.

Figure 1:
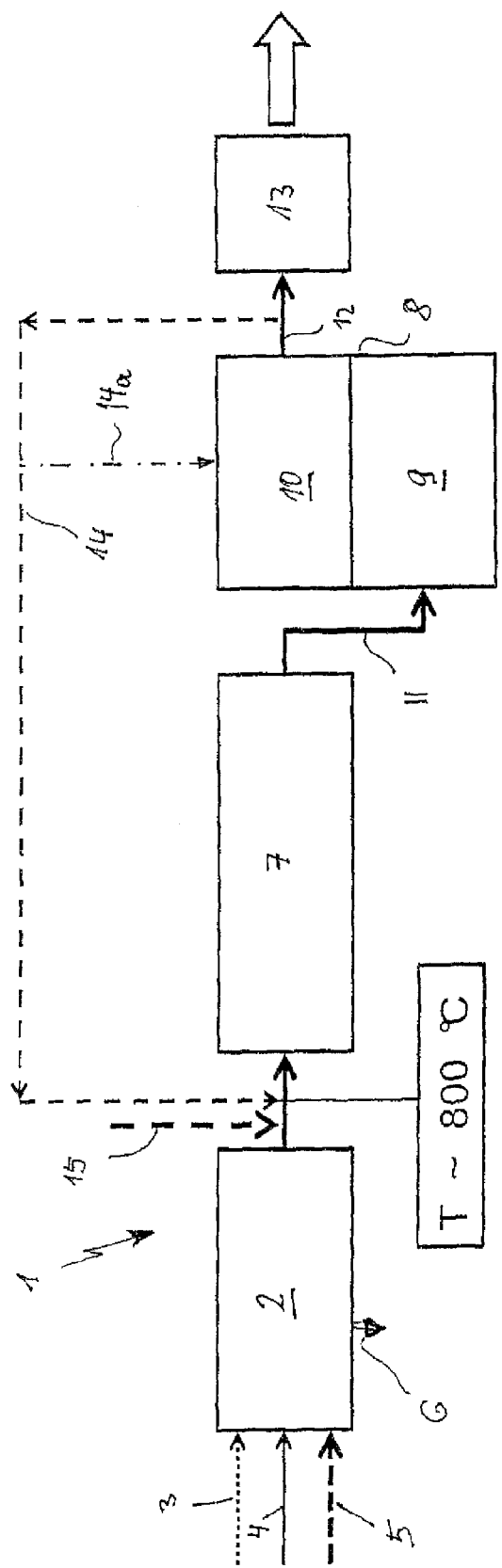

The gas feed into the cyclone 9 is indicated with an arrow 11; the useful gas outlet behind the cartridge filter 10 is indicated with an arrow 12. The useful gas, in general indicated with 13, is then passed to further processing.

A quenching gas return from the stream 12 into a region ahead of the desulfurization 7 is reproduced with a broken-line arrow 14. In this region, ahead of the desulfurization, an additive can also be fed in, as indicated with a broken-line arrow 15.

It is evident that separation of acid gas components, for example $H_2S$ separation, can take place before the dust removal, by means of adding additive(s), for example (gasifier and/or with quenching gas). Tar separation before dust removal by means of additives is also possible, whereby the pre-separation of these additives and of the dust takes place in the cyclone, and micro-dust separation takes place in the cartridge filter.

Residual separation of the tars on and/or within the cartridge filters is also possible, whereby a safety filter, for example composed of foamed ceramic, can follow the cartridge filters at the outlet. These safety filters can also be catalytically active. The quenching gas, for example indicated by a partial stream 14a, can be used to clean the filter cartridges, as will still be discussed below.

Figures 2, 3:
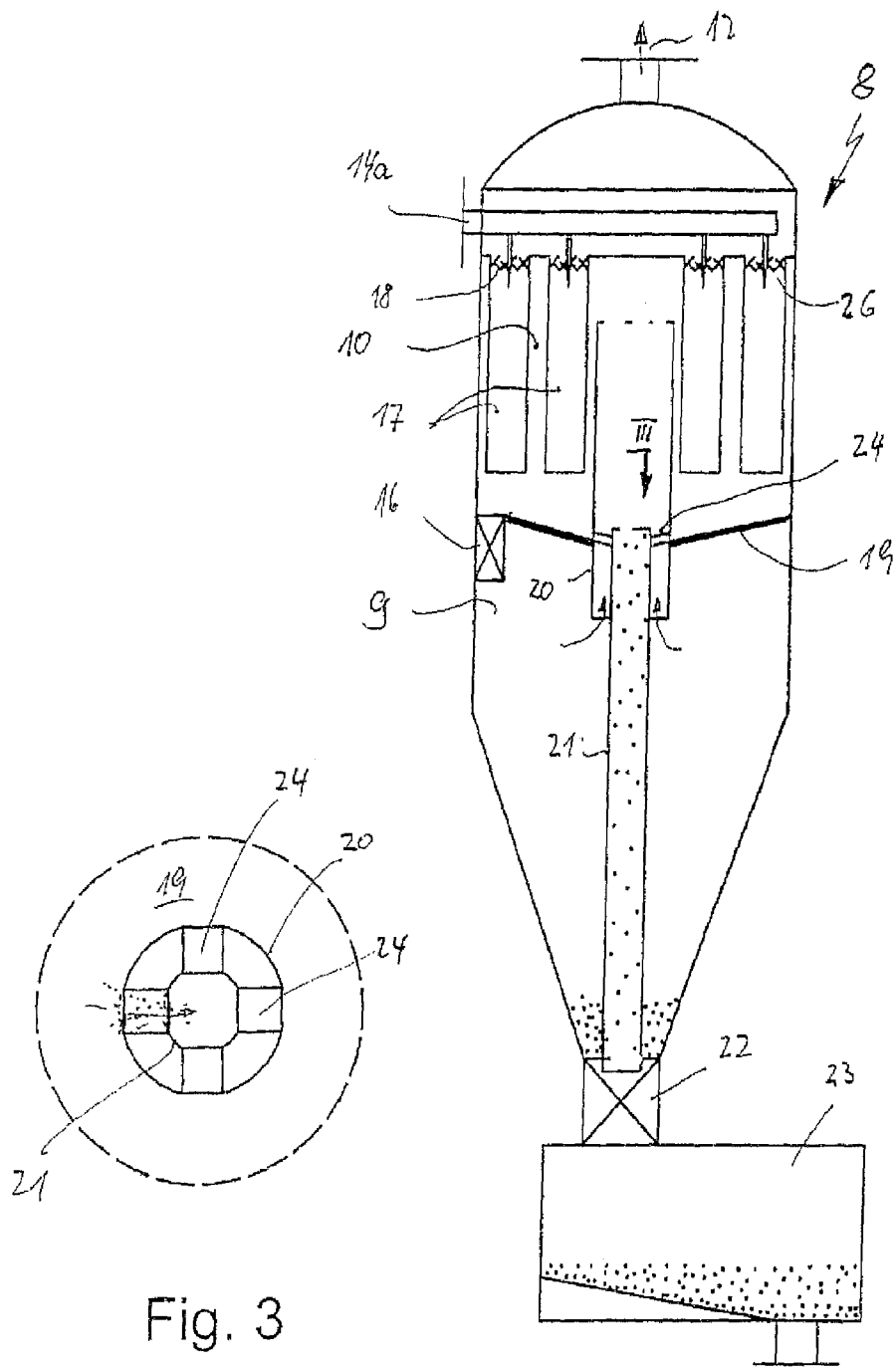

In FIG. 2, the apparatus 8 is shown in section, in simplified form; is it formed from a combination of the cyclone 9 with the cartridge filters 10. The gases charged with particles are passed to the cyclone 9 by way of a cyclone inlet 16, whereby because of the different pressure conditions, the majority of the particles is deposited downward. In the central pipe of the cyclone separator 9, the gases pre-cleaned in this manner flow upward into the cartridge filter region 10 and are cleaned by means of the cartridge filters indicated with 17. The gas cleaned in this way still flows through safety filters situated at the head of the cartridge filters, indicated with 18, and then leave the apparatus 8 according to the arrow 12.

If the cartridge filters are cleaned off by means of returned quenching gas, by way of the line 14a, for example, the dust that adheres to the filter drops onto the partition bottom 19 that is slanted at a downward incline, between cyclone 9 and cartridge filter region 10, whereby the central pipe 20 of the cyclone has an inner fitting in the bottom region 19, which is shown slightly enlarged in FIG. 3.

Micro-dust discharge pipes 24 disposed as spokes lead from the bottom 19 to the central removal pipe 21, which passes through the cyclone 9 and ends, at the bottom, in a dust discharge 22, whereby there, the dust is passed to a dust collector 23 by way of corresponding air locks.

Figure 4:
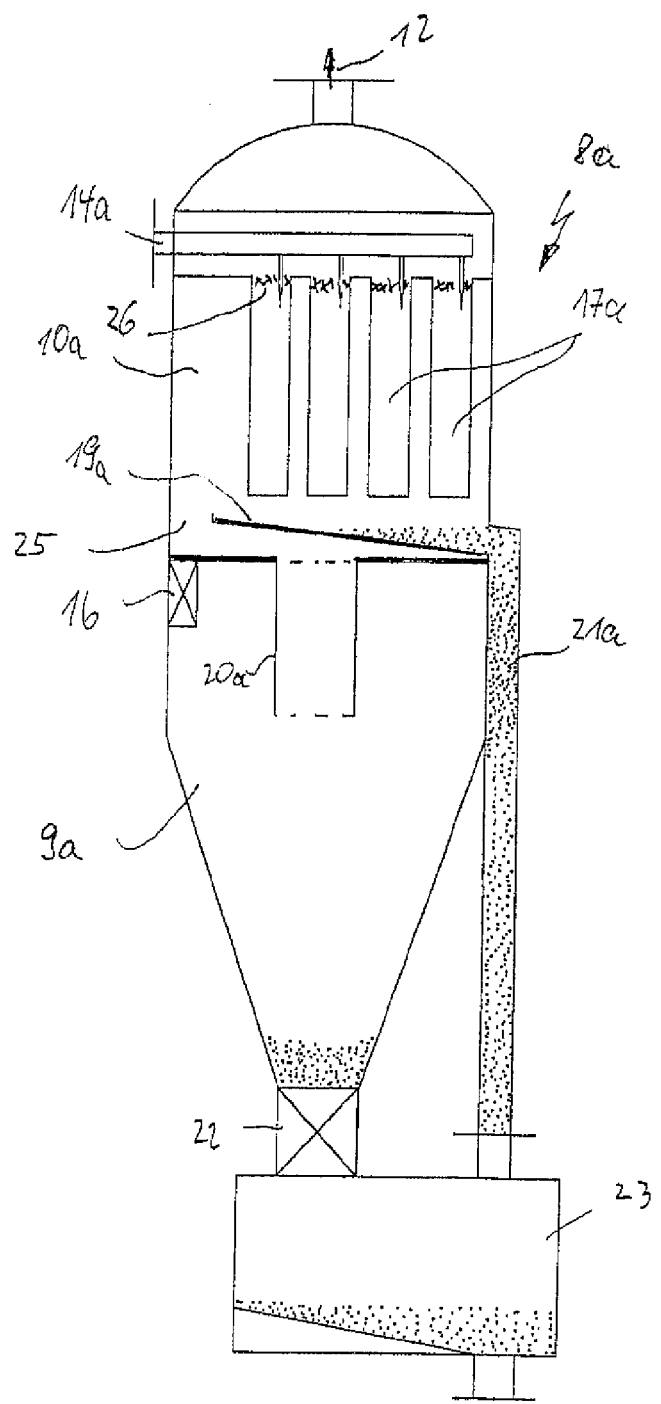

In FIG. 4, a modified exemplary embodiment is shown. Here, the discharge pipe 21a for the micro-dust out of the filter cartridge region 10a of the apparatus 8a is disposed at the side, whereby in this example, an eccentric, slanted bottom plate 19a is provided below the filter cartridges 17a, onto which plate the micro-dust falls when the filter cartridges 17a are cleaned off, and is passed out to the side. The gas that flows through the central pipe 20a of the cyclone 9a is passed to the filter cartridges 17a by way of an eccentrically disposed passage 25. The filter cartridges 17a, just like the filter cartridges 17 (FIG. 1), are equipped with catalytically active safety filters 26 in their downstream end region. For the remainder, the functionally equivalent elements in the exemplary embodiment of FIG. 4 are provided with the same reference numbers as in FIG. 2.

Of course, the exemplary embodiments of the invention that have been described can still be modified in many different ways, without departing from the basic idea; therefore FIGS. 2 to 4 merely represent the corresponding apparatuses 8 and 8a, respectively, which are essential to the invention as a combination separator, in greatly simplified form.

The invention claimed is:

1. A method for separation of acid components, dust, and tar from hot gases of gasification systems, comprising the following steps:
    providing a cyclone and a filter space equipped with filter cartridges within a common vessel, the cyclone and filter space being arranged one on top of the other in the direction of gravity and being separated by a partition configured as a funnel-shaped bottom, wherein a central pipe of the cyclone is passed into the filter space through the funnel shaped bottom,
    passing the hot gases that exit from gasification, at a temperature above 700° C., with additives, to desulfurization and subsequently to the combined cyclone and filter cartridges in the common vessel,
    feeding micro-dust from the funnel shaped bottom through feed elements to a down-pipe positioned in the central pipe, the down pipe being smaller in diameter than the central pipe, and
    drawing off the gases behind the filter cartridges, for further use.

2. The method according to claim 1 further comprising the step of separating an acid gas component before dust removal, by addition of additives.

3. The method according to claim 1, further comprising the step of separating tar before dust removal, by addition of additives.

4. The method according to claim 1, further comprising the step of separating residual tar on and/or within the filter cartridges.

* * * * *